United States Patent [19]
Divivier et al.

[11] Patent Number: 5,659,712
[45] Date of Patent: Aug. 19, 1997

[54] PIPELINED MICROPROCESSOR THAT PREVENTS THE CACHE FROM BEING READ WHEN THE CONTENTS OF THE CACHE ARE INVALID

[75] Inventors: Robert J. Divivier; Robert Bignell, both of San Jose, Calif.

[73] Assignee: National Semiconductor Corporation, Santa Clara, Calif.

[21] Appl. No.: 452,659

[22] Filed: May 26, 1995

[51] Int. Cl.$^6$ .................................................. G06F 12/00
[52] U.S. Cl. ...................... 395/481; 395/427; 395/445; 395/493; 395/651; 395/830; 364/DIG. 1
[58] Field of Search ..................... 395/462, 490, 395/493, 494, 550, 700, 750, 830, 445

[56] References Cited

U.S. PATENT DOCUMENTS

| | | | |
|---|---|---|---|
| 4,247,905 | 1/1981 | Yoshida et al. | 395/493 |
| 4,831,513 | 5/1989 | Kanazawa | 395/493 |
| 5,091,850 | 2/1992 | Culley | 395/403 |
| 5,157,774 | 10/1992 | Culley | 395/403 |
| 5,189,319 | 2/1993 | Fung et al. | 307/452 |
| 5,204,953 | 4/1993 | Dixit | 395/400 |
| 5,254,888 | 10/1993 | Lee et al. | 307/480 |
| 5,259,006 | 11/1993 | Price et al. | 375/107 |
| 5,297,270 | 3/1994 | Olson | 395/464 |
| 5,404,473 | 4/1995 | Papworth et al. | 395/375 |
| 5,408,626 | 4/1995 | Dixit | 395/400 |

FOREIGN PATENT DOCUMENTS

| | | |
|---|---|---|
| 0279421 | 8/1988 | European Pat. Off. . |
| 0624844 | 11/1994 | European Pat. Off. . |

OTHER PUBLICATIONS

Intel: Microprocessors: vol. III, Pentium Processors 1994.
Intel, Pentium Processors Users Manual, vol. II: 82496 Cache Controller and 82491 Cache SRAM data book 1994.
IBM Technical Disclosure Bulletin, vol. 35 #4A, 1 Sep. 1992, pp. 385–386, "RAM Zero Array Flushing".

Serra, Micaela & Dervisoglu, Bulent I, "Testing", Chapter 79, *The Electrical Engineering Handbook*, Richard C. Dorf, Editor–in–Chief, pp. 1808–1837, CRC Press.
L–T Wang et al., "Feedback Shift Registers For Self–Testing Circuits", *VLSI Systems Design*, Dec. 1986.
Masakazu Shoji, "CMOS Dynamic Gates", Chapter 5, *AT&T CMOS Digital Circuit Technology*, Prentice Hall, 1988, pp. 210–257.
Guthrie, Charles, "Power–On Sequencing For Liquid Crystal Displays; Why, When, And How", *Sharp Application Notes*, Sharp Corporation, 1994, pp. 2–1 thru 2–9.
Bernd Moeschen, "NS32SP160—Feature Communication Controller Architecture Specification", *National Semiconductor*, Rev. 1.0, May 13, 1993.
Agarwal, Rakesh K., *80×86 Architecture and Programming, vol. II: Architecture Reference*, Chapter 4, Prentice Hall, 1991, pp. 542–543.
Intel486 Microprocessor Family Programmer's Reference Manual, Intel Corporation, 1993.
"8237A High Performance Programmable DMA Controller (8237A, 8237A–4, 8237A–5)", *Peripheral Components*, Intel, 1992, pp. 3–14 thru 3–50.
Kane, Gerry, "R2000 Processor Programming Model", Chapter 2, *MIPS RISC Architecture*, MIPS Computer Systems, Inc.
Hennessy, John, et al., "Interpreting Memory Addresses", *Computer Architecture A Quantitative Approach*, pp. 95–97, Morgan Kaufmann Publishers, Inc. 1990.
*PowerPC601 Reference Manual*, IBM, 1994, Chapter 9, "System Interface Operation", pp. 9–15 thru 9–17.
Intel Corp. Microsoft Corp., *Advanced Power Management (APM) BIOS Interface Specification*, Revision 1.1, Sep. 1993.
Intel Corporation, *i486 Micro Processor Hardware Reference Manual*, Processor Bus, pp. 3–28 thru 3–32.

Primary Examiner—Frank J. Asta
Attorney, Agent, or Firm—Limbach & Limbach L.L.P.

[57] ABSTRACT

The power consumed by a cache memory when the cache is read is reduced by utilizing a cache access circuit to prevent the cache from being read when the information stored in the cache is invalid, such as when the processor is powered up, reset by a user, or an invalidation bit is set.

19 Claims, 4 Drawing Sheets

PIPELINED MICROPROCESSOR THAT PREVENTS THE CACHE FROM BEING READ WHEN THE CONTENTS OF THE CACHE ARE INVALID

BACKGROUND OF THE INVENTION

1. Field of the Invention

The present invention relates to pipelined microprocessors and, more particularly, to a pipelined microprocessor that prevents the cache from being read when the contents of the cache are invalid.

2. Description of the Related Art

A pipelined microprocessor is a microprocessor that operates on instructions in stages so that, at each stage of the pipeline, a different function is performed on an instruction. As a result, multiple instructions move through the pipe at the same time much like to-be-assembled products move through a multistage assembly line.

FIG. 1 shows a block diagram that illustrates the flow of an instruction through a conventional pipelined processor. As shown in FIG. 1, the first stage in the pipe is a prefetch stage. In this stage, the to-be-executed instructions are retrieved from either an instruction cache or an external memory, and are then sequentially loaded into a prefetch buffer. The purpose of the prefetch stage is to fill the prefetch buffer so that one instruction can be advanced to the decode stage, the next stage in the pipe, with each clock cycle.

In the decode stage, each instruction moving through the pipe is decoded to determine what operation is to be performed. After the decode stage, an operand stage determines if data will be needed to perform the operation and, if needed, retrieves the data from memory. Following this, the operation specified by the instruction is performed in an execution stage, while the results of the operation are stored in a write-back stage.

In the ideal case, each instruction is advanced from one stage to the next with each successive clock cycle. Thus, while it takes five clock cycles for an instruction to propagate through the pipeline, the processor appears to complete the execution of each instruction in only one clock cycle.

One situation which can stall the pipeline, or prevent instructions from advancing from one stage to the next with each clock cycle, is the inability of the processor to obtain the instructions or data required by the processor within a single clock cycle. As a result, conventional pipelined processors typically utilize an on-chip cache memory to store a limited number of instructions and data values. Since the cache memory is on-chip, the cache can typically be accessed within a single clock cycle.

Although a cache provides a technique for accessing memory within a single clock cycle, cache memories consume a substantial amount of power each time the cache is accessed. Conventionally, this power consumption is minimized by only accessing the cache when a valid cache request is present. However, because the amount of power consumed by the cache during each access is large, there is a continuing need for other techniques that limit the power consumed by the cache.

SUMMARY OF THE INVENTION

In the present invention, the power consumed by a cache memory is reduced by utilizing a cache access circuit to prevent the cache from being read when the information stored in the cache is invalid.

A cache access circuit in accordance with the present invention includes a cache that stores information, and a logic circuit that limits access to the cache. Information is inputted to the cache in response to a memory address, which identifies the cache address where the information is to be stored, when a cache write signal is asserted. Similarly, information is outputted from the cache in response to a memory address, which identifies where the to-be-output information is stored, when a cache read signal is asserted. The logic circuit, in turn, asserts the cache read signal each time an input read signal is asserted only after the cache write signal has been asserted following a system reset or a cache invalidation.

A better understanding of the features and advantages of the present invention will be obtained by reference to the following detailed description and accompanying drawings which set forth an illustrative embodiment in which the principles of the invention are utilized.

DETAILED DESCRIPTION

Figure 1:
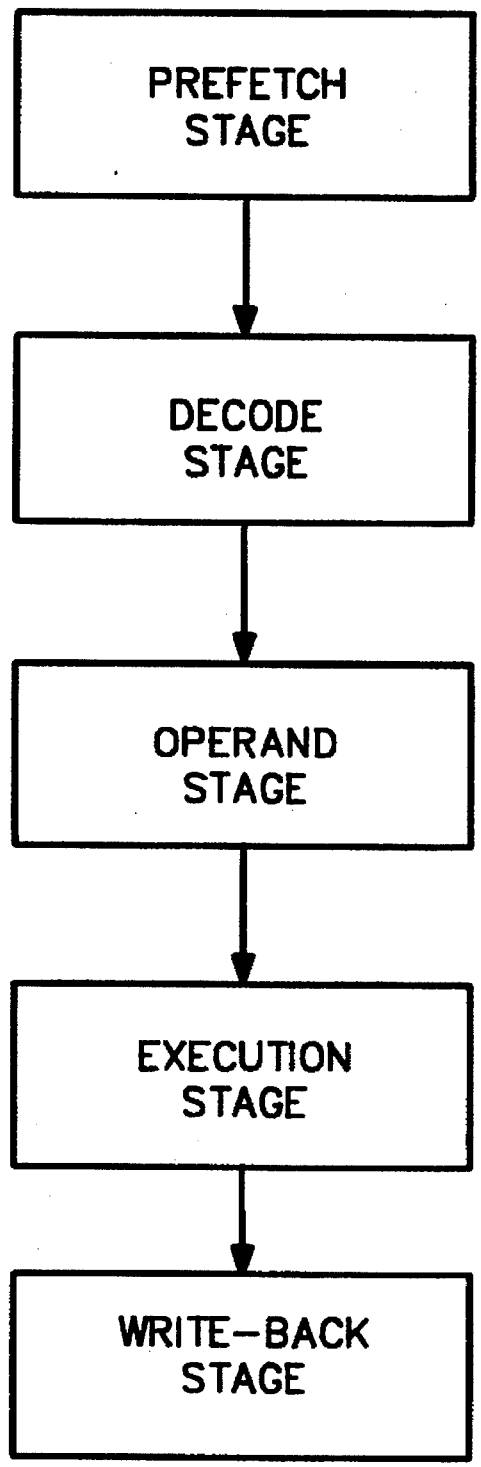
FIG. 1 is a block diagram illustrating the flow of an instruction through a conventional pipelined processor.
Figure 2:
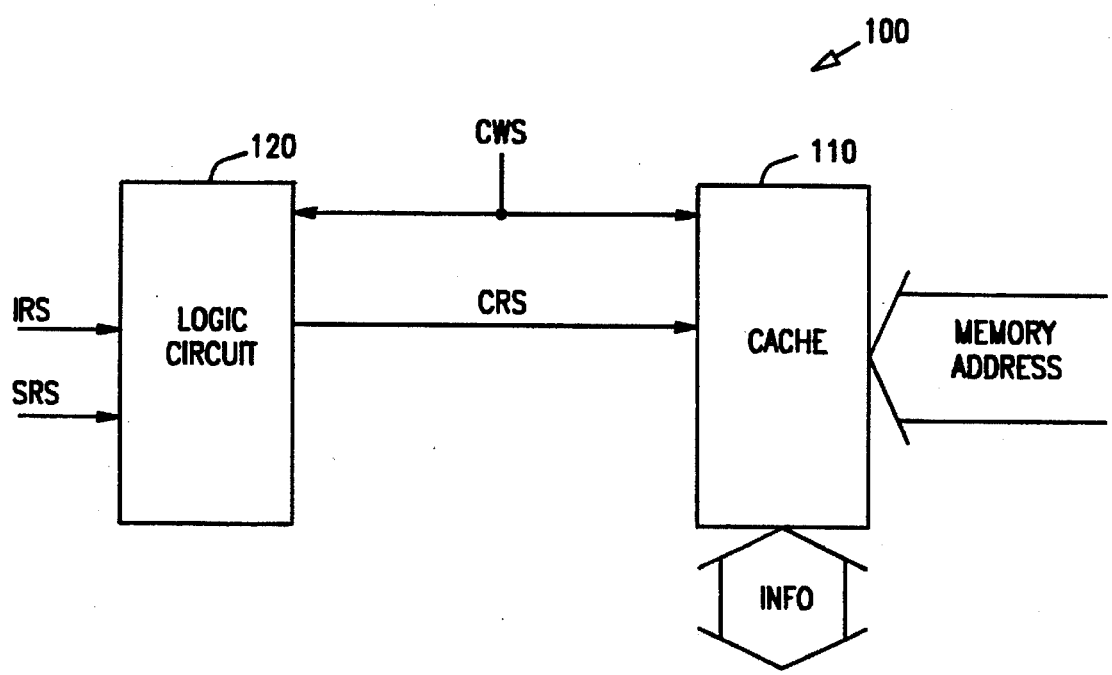
FIG. 2 is a block diagram illustrating a cache access circuit 100 in accordance with the present invention.

FIG. 2 shows a block diagram of a cache access circuit 100 in accordance with the present invention. As shown in FIG. 2, circuit 100 includes a cache 110 that stores information, and a logic circuit 120 that limits access to cache 110.

In operation, information is input to cache 110 by providing a memory address that identifies the cache address where the information is to be stored, and asserting a cache write signal CWS when the memory address and the information are stable. Similarly, information is output from cache 110 by providing a memory address that identifies a cache address where the to-be-output information is stored, and asserting a cache read signal CRS when the address is stable.

Logic circuit 120 limits access to cache 110 by asserting the cache read signal CRS each time an input read signal IRS is asserted only after the cache write signal CWS has been asserted following the assertion of a system reset signal SRS. The system reset signal SRS, in turn, is asserted each time the processor is reset, such as when the processor is powered up or reset by a user.

Figure 3:
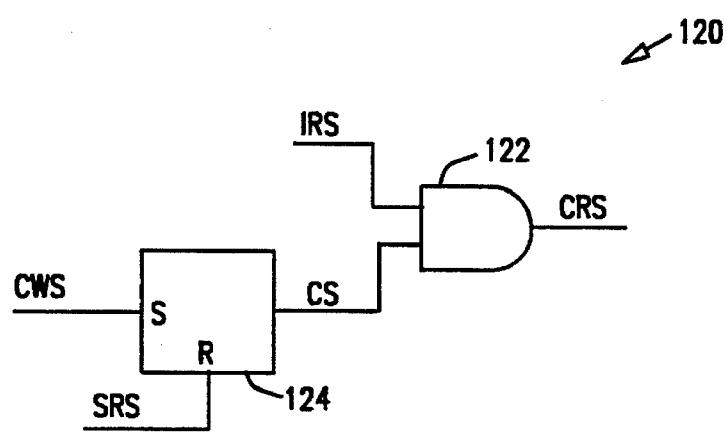
FIG. 3 is a block diagram illustrating one embodiment of logic circuit 120.

FIG. 3 shows a block diagram that illustrates one embodiment of logic circuit 120. As shown in FIG. 3, logic circuit 120 includes a logical AND gate 122 that outputs the cache read signal CRS in response to the input read signal IRS and a control signal CS. The control signal CS, in turn, is output by a flip-flop 124 that is set in response to the cache write signal CWS, and reset in response to the system reset signal SRS.

Thus, each time the system reset signal SRS resets flip-flop 124, AND gate 122 gates out the input read signal IRS, thereby preventing the cache read signal CRS from being asserted. However, when information is written to cache 110, the cache write signal CWS sets flip-flop 124, thereby allowing AND gate 122 to pass the input read signal IRS as the cache read signal CRS.

By preventing cache 110 from being read following a system reset until after information has been written into cache 110, as evidenced by the cache write signal CWS, the present invention prevents power from being consumed in reading the cache when no valid information is currently stored in the cache.

Figure 4:
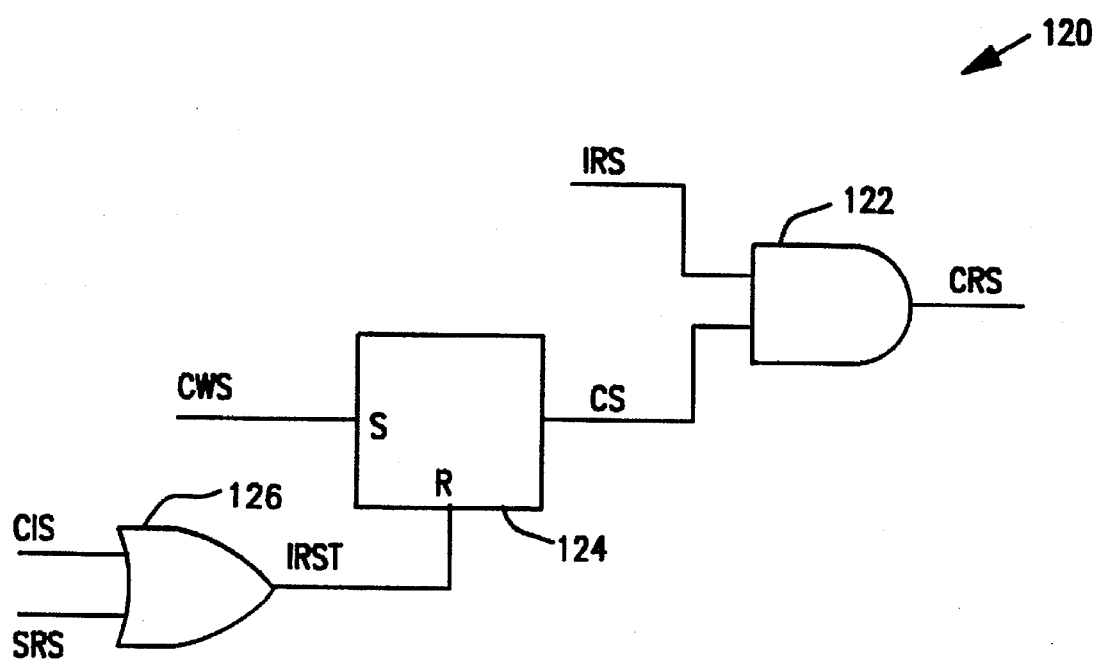
FIG. 4 is a block diagram illustrating a second embodiment of logic circuit 120.

The present invention can also be extended to those situations where the contents of cache 110 have been invalidated, such as when the processor switches from one program to another program. As with system resets, when the contents of cache 110 have been invalidated, power can be saved by not allowing cache 110 to be read until after information has been written into cache 110. For example, as shown in FIG. 4, a logical OR gate 126 can be used to reset flip-flop 124 via an intermediate reset signal IRST when either the system reset signal SRS or a cache invalidate signal CIS is asserted.

Figure 5:
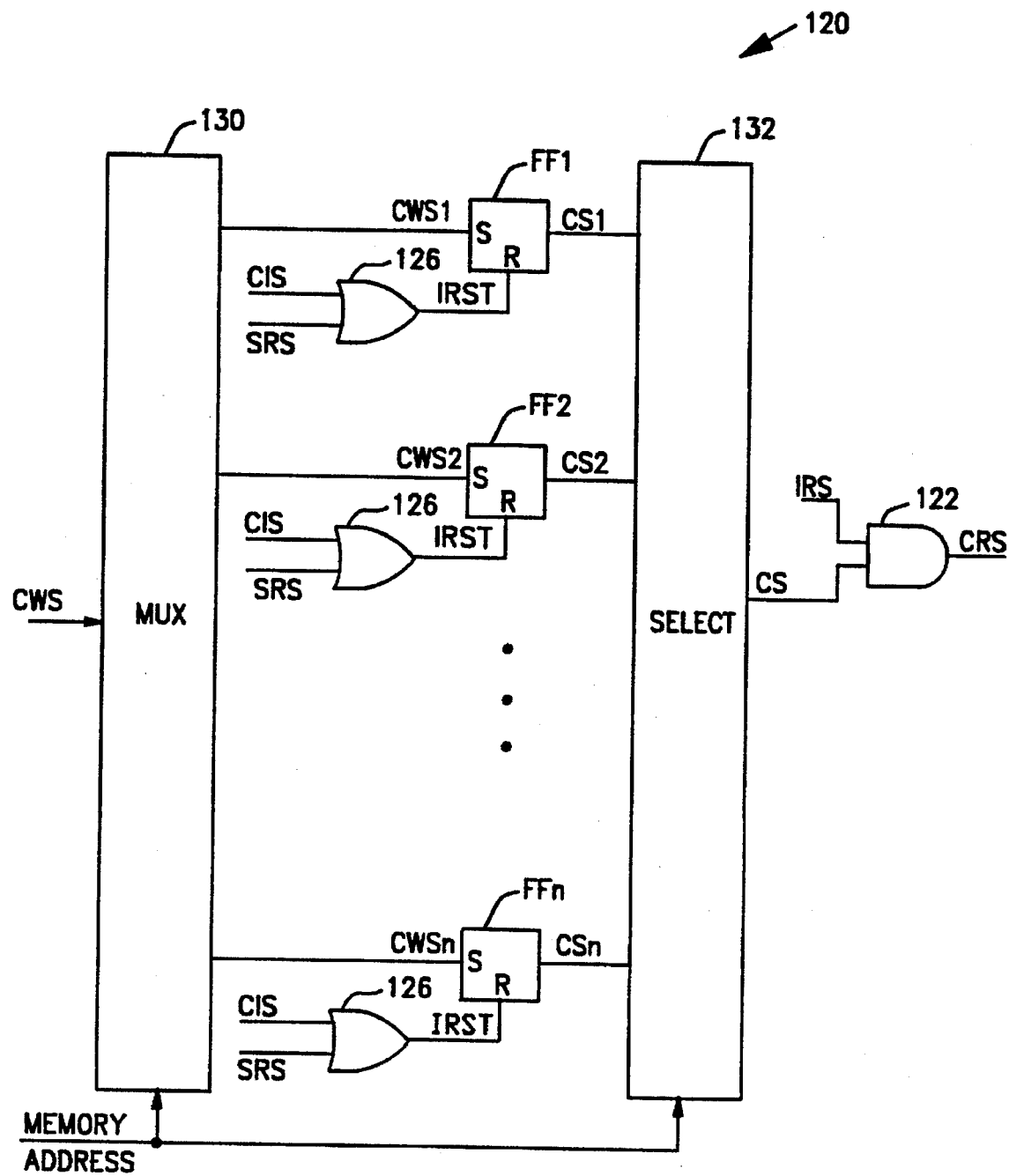
FIG. 5 is a block diagram illustrating a third embodiment of logic circuit 120.

In addition, rather than utilizing a single flip-flop as described above, a bank of flip-flops can be utilized to limit access to each line or, alternately, a group of lines, of cache 110. FIG. 5 shows a block diagram that illustrates logic circuit 120 with a bank of flip-flops FF1-FFn.

As shown in FIG. 5, when a bank of flip-flops FF1-FFn are utilized, logic circuit 120 further includes a multiplexer 130 that routes the cache write signal CWS as one of a series of intermediate cache write signals CWS1-CWSn to the flip-flop FF1-FFn that corresponds with the line or lines of cache 110 as defined by the memory address. In addition, a selector 132 receives a series of intermediate control signals CS1-CSn output from flip-flops FF1-FFn, and selects the control signal CS1-CSn from the flip-flop FF1-FFn that corresponds with the line or lines of cache 110 as defined by the memory address.

For example, if flip-flop FF1 controls line one of cache 110, then flip-flop FF1 will prevent line one from being read following a system reset or cache invalidation until the cache write signal CWS is asserted at the same time that the memory address identifies the first line of cache 110 as the line to be read. Similarly, if flip-flop FF1 controls lines 1-10, then flip-flop FF1 will prevent lines 1-10 from being read following a system reset or cache invalidation until information is written into one of these lines.

The invention embodiments described herein have been implemented in an integrated circuit which includes a number of additional functions and features which are described in the following co-pending, commonly assigned patent applications, the disclosure of each of which is incorporated herein by reference: U.S. patent application Ser. No. 08/451,319, entitled "DISPLAY CONTROLLER CAPABLE OF ACCESSING AN EXTERNAL MEMORY FOR GRAY SCALE MODULATION DATA" (atty. docket no. NSC1-62700); U.S. patent application Ser. No. 08/451,965, entitled "SERIAL INTERFACE CAPABLE OF OPERATING IN TWO DIFFERENT SERIAL DATA TRANSFER MODES" (atty. docket no. NSC1-62800); U.S. patent application Ser. No. 08/453,096, entitled "HIGH PERFORMANCE MULTIFUNCTION DIRECT MEMORY ACCESS (DMA) CONTROLLER" (atty. docket no. NSC1-62900); U.S. patent application Ser. No. 08/453,001, entitled "OPEN DRAIN MULTI-SOURCE CLOCK GENERATOR HAVING MINIMUM PULSE WIDTH" (atty. docket no. NSC1-63000); U.S. patent application Ser. No. 08/451,503, entitled "INTEGRATED CIRCUIT WITH MULTIPLE FUNCTIONS SHARING MULTIPLE INTERNAL SIGNAL BUSES ACCORDING TO DISTRIBUTED BUS ACCESS AND CONTROL ARBITRATION" (atty. docket no. NSC1-63100); U.S. patent application Ser. No. 08/451,924, entitled "EXECUTION UNIT ARCHITECTURE TO SUPPORT x86 INSTRUCTION SET AND x86 SEGMENTED ADDRESSING" (atty. docket no. NSC1-63300); U.S. patent application Ser. No. 08/451,444, entitled "BARREL SHIFTER" (atty. docket no. NSC1-63400); U.S. patent application Ser. No. 08/451,204, entitled "BIT SEARCHING THROUGH 8, 16, OR 32-BIT OPERANDS USING A 32-BIT DATA PATH" (atty. docket no. NSC1-63500); U.S. patent application Ser. No. 08/451,195, entitled "DOUBLE PRECISION (64-BIT) SHIFT OPERATIONS USING A 32-BIT DATA PATH" (atty. docket no. NSC1-63600); U.S. patent application Ser. No. 08/451,571, entitled "METHOD FOR PERFORMING SIGNED DIVISION" (atty. docket no. NSC1-63700); U.S. patent application Ser. No. 08/452,162, entitled "METHOD FOR PERFORMING ROTATE THROUGH CARRY USING A 32-BIT BARREL SHIFTER AND COUNTER" (atty. docket no. NSC1-63800); U.S. patent application Ser. No. 08/451,434, entitled "AREA AND TIME EFFICIENT FIELD EXTRACTION CIRCUIT" (atty. docket no. NSC1-63900); U.S. patent application Ser. No. 08/451,535, entitled "NON-ARITHMETICAL CIRCULAR BUFFER CELL AVAILABILITY STATUS INDICATOR CIRCUIT" (atty. docket no. NSC1-64000); U.S. patent application Ser. No. 08/445,563, entitled "TAGGED PREFETCH AND INSTRUCTION DECODER FOR VARIABLE LENGTH INSTRUCTION SET AND METHOD OF OPERATION" (atty. docket no. NSC1-64100); U.S. Pat. No. 5,546,353, entitled "PARTITIONED DECODER CIRCUIT FOR LOW POWER OPERATION" (atty. docket no. NSC1-64200); U.S. patent application Ser. No. 08/451,495, entitled "CIRCUIT FOR DESIGNATING INSTRUCTION POINTERS FOR USE BY A PROCESSOR DECODER" (atty. docket no. NSC1-64300); U.S. patent application Ser. No. 08/451,219, entitled "CIRCUIT FOR GENERATING A DEMAND-BASED GATED CLOCK" (atty. docket no. NSC1-64500); U.S. patent application Ser. No. 08/451,214, entitled "INCREMENTOR/DECREMENTOR" (atty. docket no. NSC1-64700); U.S. patent application Ser. No. 08/451,150, entitled "A PIPELINED MICROPROCESSOR THAT PIPELINES MEMORY REQUESTS TO AN EXTERNAL MEMORY" (atty. docket no. NSC1-64800); U.S. patent application Ser. No. 08/451,198, entitled "CODE BREAKPOINT DECODER" (atty. docket no. NSC1-64900); U.S. patent application Ser. No. 08/445,569, entitled "TWO TIER PREFETCH BUFFER STRUCTURE AND METHOD WITH BYPASS" (atty. docket no. NSC1-65000); U.S. patent application Ser. No. 08/445,564, entitled "INSTRUCTION LIMIT CHECK FOR MICROPROCESSOR" (atty. docket no. NSC1-65100); U.S. patent application Ser. No. 08/452,306, entitled "A PIPELINED MICROPROCESSOR THAT MAKES MEMORY REQUESTS TO A CACHE MEMORY AND AN EXTERNAL MEMORY CONTROLLER DURING THE SAME CLOCK CYCLE" (atty. docket no. NSC1-65200); U.S. patent application Ser. No. 08/452,080, entitled "APPARATUS AND METHOD FOR EFFICIENT COMPUTATION OF A 486™ MICROPROCESSOR COMPATIBLE POP INSTRUCTION" (atty. docket no. NSC1-65700); U.S. patent application Ser. No. 08/450,154, entitled "APPARATUS AND METHOD FOR EFFICIENTLY DETERMINING ADDRESSES FOR MISALIGNED DATA STORED IN MEMORY" (atty. docket no. NSC1-65800); U.S. patent application Ser. No. 08/451,742, entitled "METHOD OF IMPLEMENTING FAST 486™ MICROPROCESSOR COMPATIBLE STRING OPERATION" (atty. docket no. NSC1-65900); U.S. patent application Ser. No. 08/452,659, entitled "A PIPELINED MICROPROCESSOR THAT PREVENTS THE CACHE FROM BEING READ WHEN THE CONTENTS OF THE CACHE ARE INVALID" (atty. docket no. NSC1-66000); U.S. patent application Ser. No. 08/451,507, entitled "DRAM CONTROLLER THAT REDUCES THE TIME REQUIRED TO PROCESS MEMORY REQUESTS" (atty. docket no. NSC1-66300); U.S. patent application Ser. No. 08/451,420, entitled "INTEGRATED PRIMARY BUS AND SECONDARY BUS CONTROLLER WITH REDUCED PIN COUNT" (atty. docket no. NSC1-66400); U.S. patent application Ser. No. 08/452,365, entitled "SUPPLY AND INTERFACE CONFIGURABLE INPUT/OUTPUT BUFFER" (atty. docket no. NSC1-66500); U.S. patent application Ser. No. 08/451,744, entitled "CLOCK GENERATION CIRCUIT FOR A DISPLAY CONTROLLER HAVING A FINE TUNEABLE FRAME RATE" (atty. docket no. NSC1-66600); U.S. patent application Ser. No. 08/451,206, entitled "CONFIGURABLE POWER MANAGEMENT SCHEME" (atty. docket no. NSC1-66700); U.S. patent application Ser. No. 08/452,350, entitled "BIDIRECTIONAL PARALLEL SIGNAL INTERFACE" (atty. docket no. NSC1-67000); U.S. patent application Ser. No. 08/452,094, entitled "LIQUID CRYSTAL DISPLAY (LCD) PROTECTION CIRCUIT" (atty. docket no. NSC1-67100); U.S. patent application Ser. No. 08/450,156, entitled "DISPLAY CONTROLLER CAPABLE OF ACCESSING GRAPHICS DATA FROM A SHARED SYSTEM MEMORY" (atty. docket no. NSC1-67500); U.S. Pat. No. 3,541,935, entitled "INTEGRATED CIRCUIT WITH TEST SIGNAL BUSES AND TEST CONTROL CIRCUITS" (atty. docket no. NSC1-67600); U.S. patent application Ser. No. 08/445,568, entitled "DECODE BLOCK TEST METHOD AND APPARATUS" (atty. docket no. NSC1-68000).

It should be understood that various alternatives to the embodiment of the invention described herein may be employed in practicing the invention. For example, although logic circuit 110 has been described with specific logic elements, those skilled in the art will appreciate that other logic combinations can be utilized as well.

Thus, it is intended that the following claims define the scope of the invention and that methods and structures within the scope of these claims and their equivalents be covered thereby.

What is claimed is:

1. A cache access circuit for limiting access to a cache memory, the circuit comprising:

a cache having a plurality of cache addresses that stores information received by the cache at a cache address identified by an input address when a cache write signal is asserted, and that outputs information stored at a cache address identified by the input address when a cache read signal is asserted; and a logic circuit that asserts the cache read signal each time an input read signal is asserted only after the cache write signal has been asserted following a system reset.

2. A cache access circuit for limiting access to a cache memory, the circuit comprising:

a cache having a plurality of cache addresses that stores information received by the cache at a cache address identified by an input address when a cache write signal is asserted, and that outputs information stored at a cache address identified by the input address when a cache read signal is asserted; and a logic circuit that asserts the cache read signal each time an input read signal is asserted only after the cache write signal has been asserted following a system reset, the logic circuit including:

a first circuit that outputs the cache read signal in response to the input read signal and a control signal; and a second circuit that outputs the control signal in response to the cache write signal and a system reset signal.

3. The circuit of claim 2 wherein the first circuit includes an AND gate.

4. The circuit of claim 2 wherein the second circuit includes a flip-flop.

5. The circuit of claim 4 wherein the flip-flop is set in response to the cache write signal, and is reset in response to the system reset signal.

6. The circuit of claim 1 wherein once the information stored in the cache has been invalidated, the logic circuit asserts the cache read signal each time the input read signal is asserted only after the cache write signal has been asserted.

7. The circuit of claim 5 wherein the logic circuit includes:

a first circuit that outputs the cache read signal in response to the input read signal and a control signal;

a second circuit that outputs the control signal in response to the cache write signal and an intermediate reset signal; and a third circuit that outputs the intermediate reset signal in response to one of a plurality of system signals including a system reset signal and a cache invalidate signal.

8. The circuit of claim 7 wherein the first circuit includes an AND gate.

9. The circuit of claim 7 wherein the second circuit includes a flip-flop.

10. The circuit of claim 9 wherein the flip-flop is set in response to the cache write signal, and is reset in response to the intermediate reset signal.

11. The circuit of claim 7 wherein the third circuit includes an OR gate.

12. A cache access circuit for limiting access to a cache memory, the circuit comprising:

a cache having a plurality of cache addresses that stores information received by the cache at a cache address identified by an input address when a cache write signal is asserted, and that outputs information stored at a cache address identified by the input address when a cache read signal is asserted; and a logic circuit that asserts the cache read signal each time an input read signal is asserted only after the cache write signal has been asserted following a system reset, the logic circuit including:

a first circuit that outputs the cache read signal in response to the input read signal and a control signal;

a plurality of second circuits that output a corresponding plurality of intermediate control signals in response to a corresponding plurality of intermediate cache write signals and a system reset signal;

a selector that outputs the control signal by selecting one of the plurality of intermediate control signals in response to the input address; and a multiplexer that outputs one of the plurality of intermediate cache write signals in response to the cache write signal and the input address.

13. The circuit of claim 12 wherein the first circuit includes an AND gate.

14. The circuit of claim 13 wherein at least one of the second circuits includes a flip-flop.

15. A method for limiting access to a cache memory having a plurality of cache addresses, the method comprising the steps of:

outputting information stored at a cache address identified by an input address when a cache read signal is asserted; and asserting the cache read signal each time an input read signal is asserted only after a cache write signal has been asserted following a system reset.

16. The method of claim 11 and further comprising the step of asserting the cache read signal each time the input read signal is asserted only after the cache write signal has been asserted following invalidation of the information stored in the cache memory.

17. A method for limiting access to a cache memory having a plurality of cache addresses, the method comprising the steps of:

outputting information stored at a cache address identified by an input address when a cache read signal is asserted; and asserting the cache read signal each time an input read signal is asserted only after a cache write signal that corresponds with a range of cache addresses that includes the cache address has been asserted following a system reset or cache invalidation.

18. The method of claim 17 wherein the range of cache addresses is one address.

19. A cache access circuit for limiting access to a cache memory, the circuit comprising:

a cache having a plurality of cache addresses that stores information received by the cache at a cache address identified by an input address when a cache write signal is asserted, and that outputs information stored at a cache address identified by the input address when a cache read signal is asserted; and a logic circuit that asserts the cache read signal each time an input read signal is asserted only after the cache write signal has been asserted following a cache invalidation.

* * * * *